United States Patent
Wu et al.

(10) Patent No.: US 7,471,607 B2
(45) Date of Patent: Dec. 30, 2008

(54) MIXED MODE DATA SLICER WITH AUTO CALIBRATION AND METHOD THEREOF

(75) Inventors: Jan-Tang Wu, Taipei (TW); Wei-Chung Wu, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 498 days.

(21) Appl. No.: 10/896,032

(22) Filed: Jul. 22, 2004

(65) Prior Publication Data
US 2005/0261845 A1 Nov. 24, 2005

(30) Foreign Application Priority Data
May 21, 2004 (TW) ............................... 93114339 A

(51) Int. Cl.
*G11B 20/10* (2006.01)
(52) U.S. Cl. ............. 369/59.21; 369/59.17; 369/124.11
(58) Field of Classification Search ............. 369/59.17, 369/59.18, 59.21, 124.05, 124.11, 124.12
See application file for complete search history.

(56) References Cited

U.S. PATENT DOCUMENTS

| | | | | |
|---|---|---|---|---|
| 5,974,088 A | * | 10/1999 | Chang | ................... 369/59.17 |
| 6,525,684 B2 | * | 2/2003 | Tsujikawa | ................... 341/155 |
| 6,914,861 B2 | * | 7/2005 | Chou et al. | ............. 369/59.16 |
| 7,065,026 B2 | * | 6/2006 | Hung et al. | ............. 369/59.17 |
| 2004/0027940 A1 | * | 2/2004 | Minamino et al. | ....... 369/59.24 |

* cited by examiner

*Primary Examiner*—Thang V. Tran
(74) *Attorney, Agent, or Firm*—Troxell Law Office, PLLC

(57) ABSTRACT

The present invention discloses a mixed mode circuit for data slice with auto calibration and method thereof, which comprises a data slicer for converting an analog signal into a digital signal; a set of current pump for supplying a variable power supply; a microprocessor for controlling and adjusting the set of current pump; a digital sum value counter for performing an addition or a subtraction operation according to the result outputted by the data slicer; a digital signal processor for reading the internal values of the digital sum value counter and calculating the average of these internal values to obtain a parameter value. With the aforementioned structure, the invention integrates the mixed mode data slicer of analog and digital circuits so as to adopt the merits and eliminate the drawbacks of the pure analog and digital data slicer and thus achieves the objective of reading data from an optical disk better and more accurately.

8 Claims, 4 Drawing Sheets

MIXED MODE DATA SLICER WITH AUTO CALIBRATION AND METHOD THEREOF

FIELD OF THE INVENTION

The present invention relates to a data slice with auto calibration and method thereof, and more particularly, to a mixed mode data slicer that integrates analog and digital circuits by adopting the merits and eliminating the drawbacks of the pure analog data slicer and digital data slicer so as to achieve the objective of reading the data from an optical disk better and more accurately.

BACKGREVOLUTION OF THE INVENTION

As electronic products, particularly computer peripherals, are developing in a fast path, and the present computer data is very large, general storage media except hard disks no longer fulfill the requirements. The present computer users usually back up computer data by using DVD or VCD burners, and the capacity of each optical disk (VCD format or DVD format) ranges from 700 MB to 4.7 GB in order to comply with the requirements of storing large quantity of computer data.

At present, the essential criteria considered by a user while buying a burner includes not only the duplication speed, but also the copying program used in the burner. While keeping the fastest and best duplication speed, it is very important for a burner to possess high stability and good duplication quality, since the duplicated optical disk may be damaged otherwise. Therefore, the way of concurrently taking care of the duplication speed and the quality of the duplicated disk has become an issue that demands immediate attention.

Please refer to FIG. 1, which is a schematic block diagram of a conventional data slicer basing on an analog low-pass filter. In the data reading process of a conventional optical disk or a burner, which can be either of VCD format or of DVD format, the data stored in the optical disk is read by an optical pickup head to be converted by an optoelectronics IC and then amplified by a pre-amp so as to generate an analog signal, which is referred as RF hereinafter. The RF signal is sliced by a data slicer to produce a digital signal, which is referred as SLRF hereinafter. The SLRF is the signal read by the computer. The data slicer primary comprises a comparator and a low-pass filter (LPF), wherein the comparator has an input for receiving the RF signal and another input for receiving a reference level signal, which is referred as DSSLV hereinafter, and an output end thereof for outputting the SLRF signal, and the low-pass filter is coupled between the input of the comparator receiving the DSSLV signal and the output of the same.

With the foregoing structure, a tiny error in the IC manufacturing process will cause a signal drift phenomenon since an analog circuit is used for processing the central level of the SLRF, such that a mismatch is produced between the central level of the SLRF and the data slicer and thus reduce the performance of the data slicer.

Further, the U.S. Pat. No. 5,974,088 disclosed a digital data slicer, that the digital slicer comprise a digital sum value (DSV) counter, a digital filter and a digital-to-analog (D/A) converter, and is capable of generating a reference level signal without signal drifting. However, the architecture of such data slicer has a problem of not responding fast enough for bandwidth adjustment.

If the aforementioned data slicer purely adopts the design of analog circuit, the process shift will occur. Alternatively, if purely digital data slicer is used, there will be an issue of having a response speed not fast enough for bandwidth adjustment. To solve the problem as mention above, the present invention provides a compromise structure and signal processing method that uses a mixed mode data slicer integrating analog and digital circuits. The present invention adopts the merits and eliminates the drawbacks of the digital and analog data slicer and achieves the objective of reading data better and more accurately.

SUMMARY OF THE INVENTION

To overcome the aforementioned shortcomings of the prior art, the present invention discloses a mixed mode data slice with auto calibration and method thereof. It is the primary object of the present invention to establish an automatic calibration mechanism by adding a setup function for fine tuning current for an analog circuit combining with a digital circuit to execute the function of a sum value counter for calibrating an over-accumulated value by a digital signal processor (DSP), and to combine the auto calibration mechanism with a mixed mode data slicer so as to adopt the merits and eliminate the drawbacks of the analog and digital data slicer and have a preferred and more accurate reading from an optical disk.

To achieve the foregoing objective, the present invention discloses a mixed mode data slice with auto calibration, comprising:
a data slicer, for converting an analog signal into a digital signal;
a set of current pump, for supplying a variable power supply;
a microprocessor, for controlling and adjusting the value of the power supply of the set of current pump;
a digital sum value counter, for performing an addition or a subtraction operation according to the result outputted by the data slicer;
a digital signal processor, for reading the internal values of the digital sum value counter and calculating the average of these internal values to obtain a parameter value.

In a preferred embodiment of the invention, the data slicer further comprises a comparator and a low-pass filter.

In a preferred embodiment of the invention, the current pump further comprises an up current pump and a down current pump.

To make it easier for our examiner to understand the objective of the invention, its structure, innovative features, and performance, we use a preferred embodiment including but not limited to the attached drawings for the detailed description of the invention.

DESCRIPTION OF THE PREFERRED EMBODIMENT

The above and other objects and the nature and feature of the present inventions will be more apparent from the detailed description of preferred embodiments, taken in conjunction with the drawings.

If a data slicer purely adopts the design of purely analog circuit, the process shift will occur. Alternatively, if pure digital data slicer is used, there will be an issue of having a response speed not fast enough for bandwidth adjustment. To solve the problem as mention above, the present invention provides a compromise structure and signal processing method that uses a mixed mode data slicer integrating analog and digital circuits. The present invention adopts the merits and eliminates the drawbacks of the digital and analog data slicer and achieves the objective of reading data better and more accurately.

Figure 1:
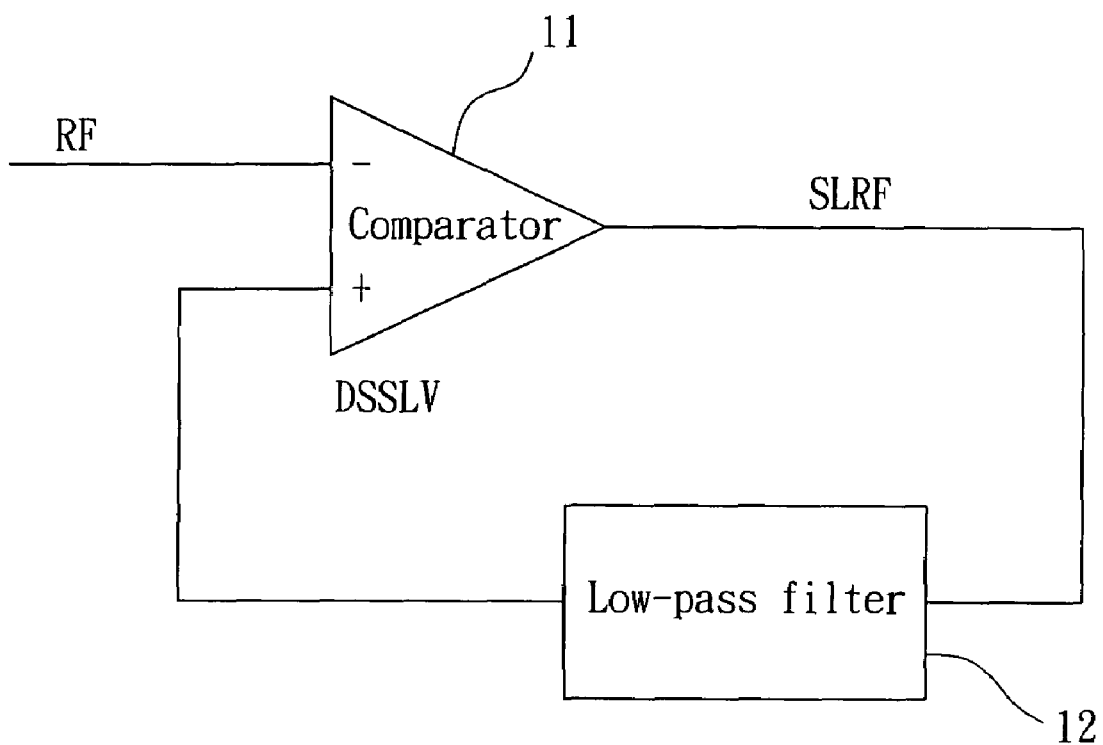
FIG. 1 is a schematic block diagram of a conventional data slicer which is basing on an analog low-pass filter.
Figure 2:
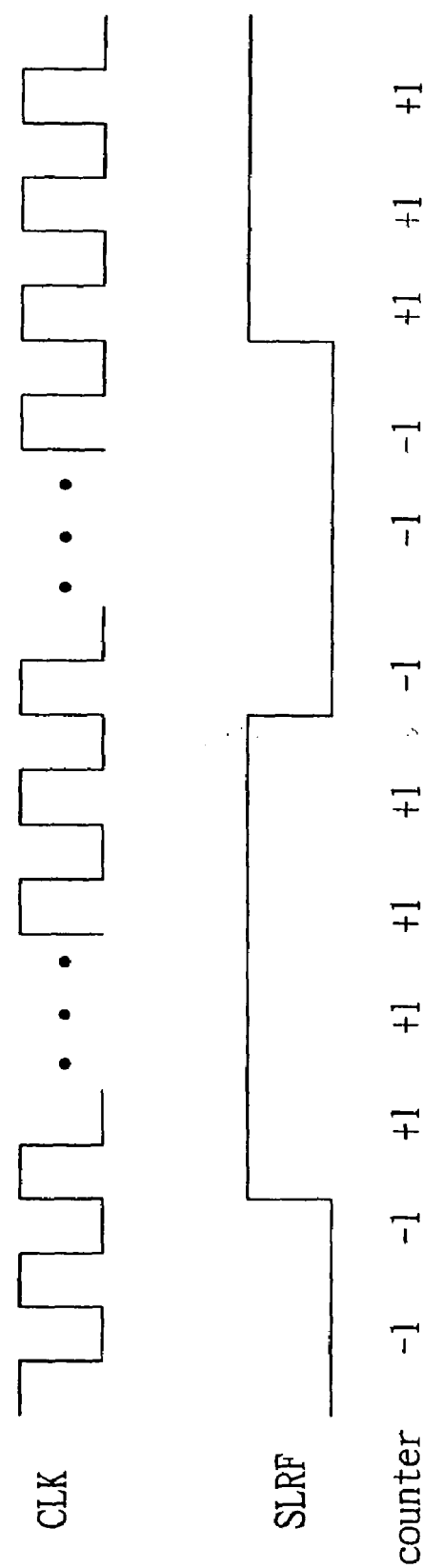
FIG. 2 is timing diagram showing the relation between the digital sum value counter and the SLRF signal according to the present invention.

Please refer to FIG. 2 for the diagram illustrating the relation between the digital sum value counter and the SLRF signal according to the present invention. The data slicer of the invention counts the number of 1's and 0's in an output binary SLRF signal stream to produce a running sum DSV from the binary values of the transmitted bits. Thus, at the appearance of each clock pluse in a clock signal CLK, if the currently received SLRF signal is at a first logic level, for example 1, the data slicer increases the DSV by one; while if the currently received SLRF signal is at a second logic level, for example 0, the data slicer decreases the DSV by one. In an ideal condition, the digital sum value of the sliced signal should approach zero.

Figure 3:
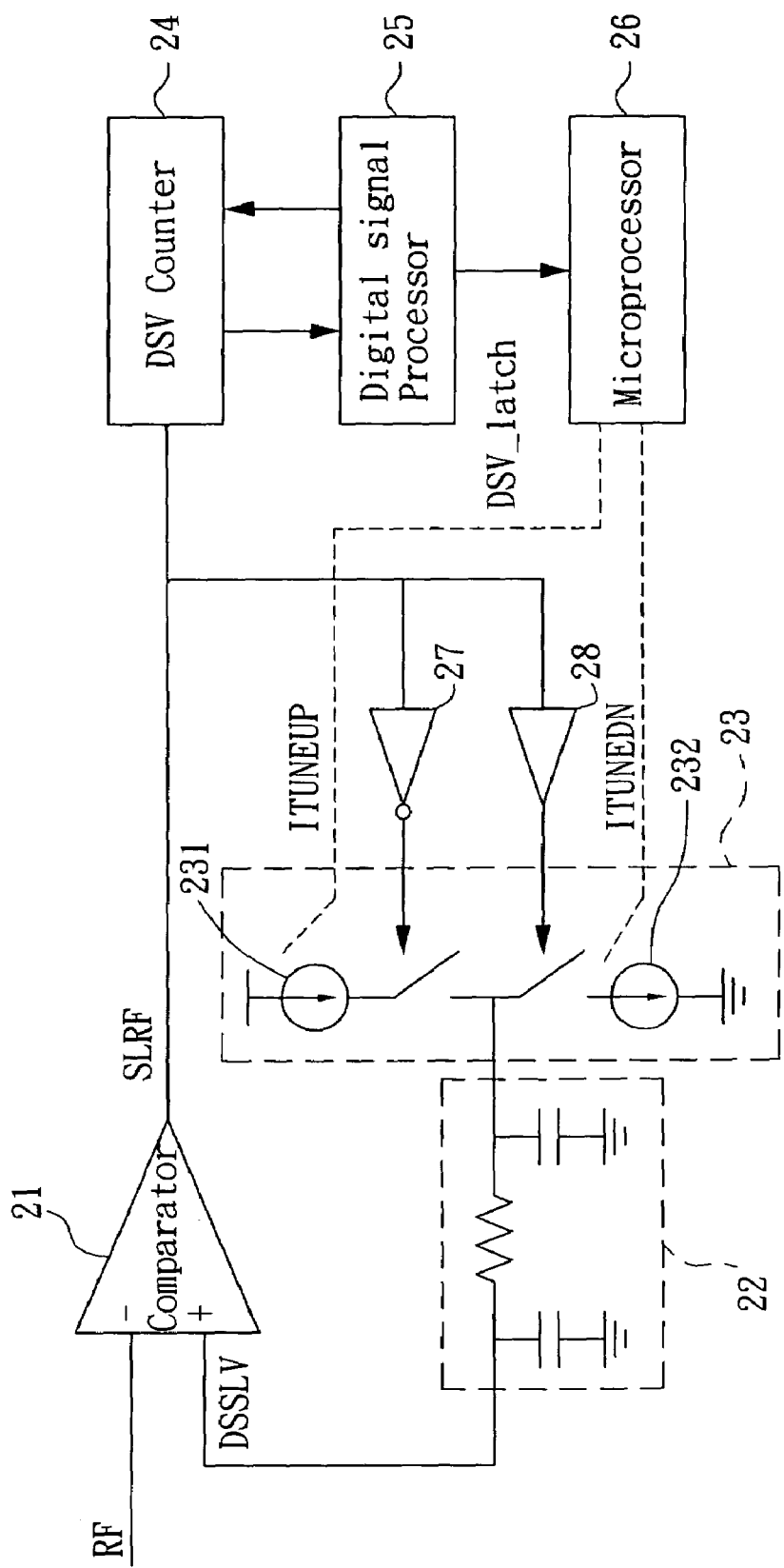
FIG. 3 is a schematic block diagram of a mixed mode data slicer with auto calibration according to the present invention.

Please refer to FIG. 3, which a schematic block diagram of a mixed mode data slicer with auto calibration according to the present invention. The analog circuit of the data slicer of the invention comprises a comparator 21 and a low-pass filter 22, which is the same as the structure of a conventional data slicer. In addition, a set of current pump 23 including an up current pump 231 and a down current pump 232 is further coupled to an end of the low-pass filter 22, and a digital sum value counter (DSV counter) 24 is further coupled to the output of the comparator 21; where the output of the comparator 21 and the set of the current pump 23 are connected respectively through a positive gate 27 and an inverted gate 28, and the digital sum value counter 24 is coupled with the digital signal processor (DSP) 25, and the digital signal processor 25 is coupled with a microprocessor 26. In this regard, the microprocessor 26 can control and adjust the current pump 23 according to a DSV_latch signal send from the digital signal processor 25 by using the two control signal lines ITUNEUP and ITUNEDN extended from the microprocessor 26, wherein the ITUNEUP signal line controls the up current pump 231 and the ITUNEDN signal line controls the down current pump 232.

Figure 4:
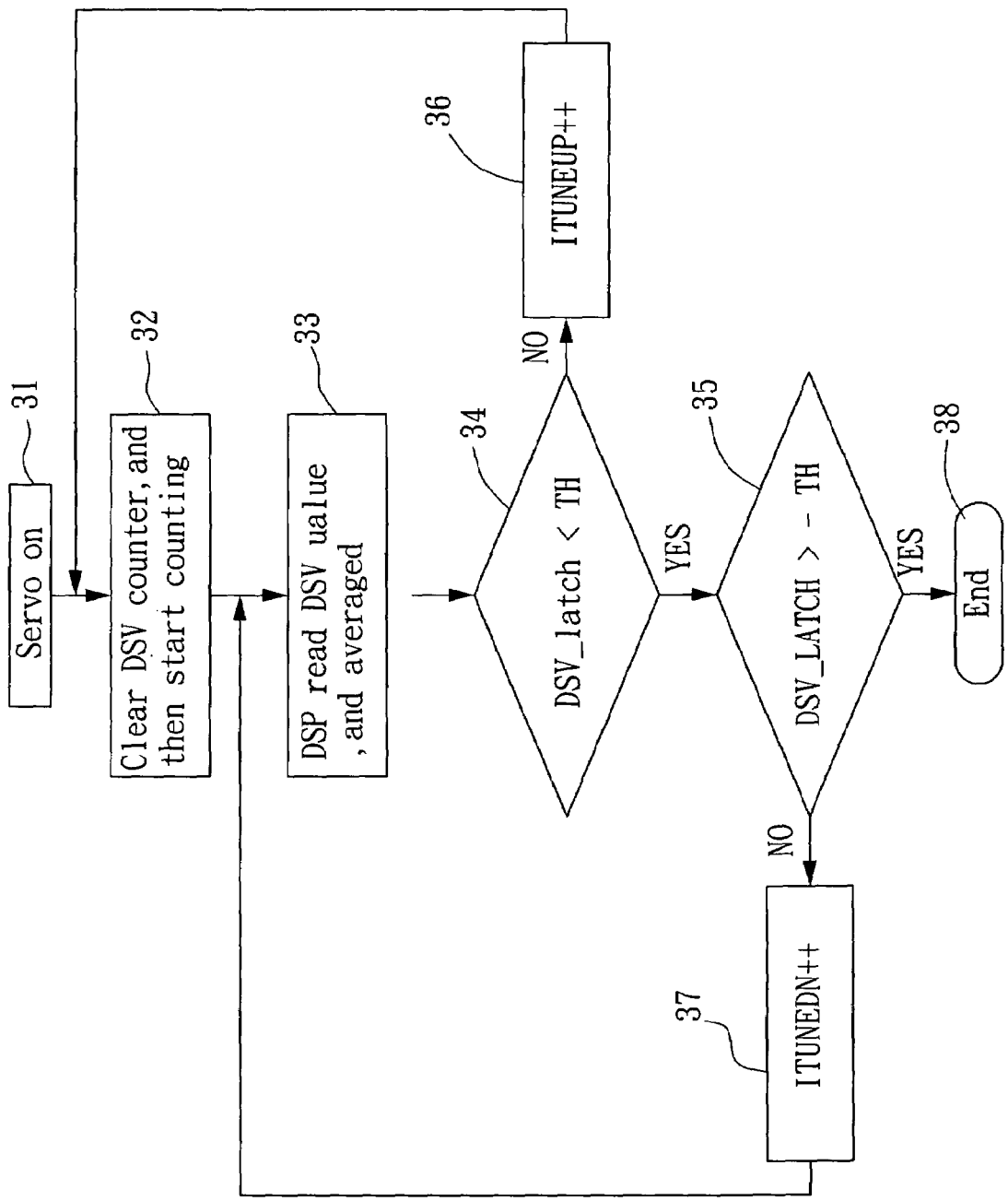
FIG. 4 is a flow chart showing an auto calibration method applying the mixed mode data slicer according to the present invention.

Please also refer to FIG. 4, which is a flow chart showing an auto calibration method applying the mixed mode data slicer of FIG. 3. The method comprises the step of:

Step 31: turning on a server;

Step 32: clearing the digital sum value counter, and then start counting;

Step 33: employing the digital signal processor to read the values of the digital sum value counter and then averaging of the values; if the averaged value does not fall within a reference voltage range, i.e. [−TH, TH], it represents a drift phenomenon occurs, therefore it is necessary to adjust the current of the current pump 23 according to the factors of adjustment as described in Steps 34 and 35;

Step 34: checking whether the DSV_latch is smaller than the positive value of the reference voltage range, i.e. TH; if so, then goes to Step 35, that is, if the reference averaged value is larger than TH, the reference level signal (DSSLV) is too high and thus it is necessary to increase the current of the down current pump 232 that is executed by the microprocessor 26 to achieve a balanced adjustment; otherwise, then goes to Step 36;

Step 35: checking whether the DSV_latch is larger than the negative value 35 of the reference voltage, i.e. −TH; if so, then goes to Step 38; otherwise, goes to Step 36, that is, if the reference averaged value is smaller than −TH, the reference level signal (DSSLV) is too low and thus it is necessary to increase the current of the up current pump that is executed by the microprocessor 26 to achieve a balanced adjustment;

Step 36: increasing the current of the up current pump;

Step 37: increasing the current of the down current pump; and

Step 38: ending the procedure.

In summation of the description above, the structure and characteristics of the preferred embodiments of the invention are disclosed in details, and the invention definitely can establish an auto calibration mechanism by adding the setup function for fine tuning the current of an analog circuit and integrating the function of a sum value counter of a digital circuit, wherein a digital signal processor (DSP) is used to correct the over-accumulated sum value. The present invention also discloses a mixed mode data slice that integrates the analog and digital circuits, which adopts the merits and eliminates the drawbacks of the analog and digital data slicer to achieve the objective of reading data from an optical disk much better and more accurately.

While the preferred embodiment of the invention has been set forth for the purpose of disclosure, modifications of the disclosed embodiment of the invention as well as other embodiments thereof may occur to those skilled in the art. The appended claims are intended to cover all embodiments which do not depart from the spirit and scope of the invention.

What is claimed is:

1. A mixed mode circuit for a data slicer with auto calibration, comprising: a comparator for receiving an analog signal a set of current pumps, for supplying a reference level signal to the comparator; a microprocessor, for controlling and adjusting said set of current pumps; a digital sum value counter, for performing an addition/subtraction operation according to the result outputted by the comparator; a digital signal processor, coupled to the digital sum value counter and the microprocessor, for reading values of said digital sum value counter and calculating the average of said values to obtain a parameter value, wherein the data slicer is capable of converting an analog signal into a digital signal.

2. The mixed mode circuit for the data slicer with auto calibration of claim 1, further comprising a low-pass filter coupled to the comparator and the set of current pumps.

3. The mixed mode circuit for the data slicer with auto calibration of claim 2, further comprising a positive gate and an inverted gate being extendedly disposed between said digital sum value counter and said set of current pumps.

4. The mixed mode circuit for the data slicer with auto calibration of claim 1, wherein said set of current pumps comprises an up current pump and a down current pump.

5. The mixed mode circuit for the data slicer with auto calibration of claim 4, wherein said microprocessor comprises two control signal lines ITUNEUP and ITUNEDN, and said ITUNEUP signal line controls the up current pump and the ITUNEDN signal line controls the down current pump.

6. An auto calibration method applying in a mixed mode data slicer, comprising: (1) turning on a servo; (2) clearing a digital sum value counter, and then start counting; (3) employing a digital signal processor to read values of the digital sum value (DSV) counter and then averaging of the values to obtain a DSV-latch; (4) employing a microprocessor to check whether the DSV-latch is smaller than the positive value of a reference voltage range; (5) using the microprocessor to check whether the DSV-latch is larger than the negative value of a reference voltage range; (6) increasing a current of an up current pump using the microprocessor if the DSV-latch is not larger than the negative value of the reference voltage range; (7) increasing the current of a down current pump if the DSV-latch is not smaller than the positive value of the reference voltage range; and (8) ending the procedure.

7. The method of claim 6, wherein an evaluation is being made to determine whether the DSV-latch is larger than the negative value of the reference voltage range while the DSV-latch is smaller than the positive value of a reference voltage range.

8. The method of claim 6, wherein the procedure is ended while the DSV-latch is larger than the negative value of the reference voltage range.

* * * * *